United States Patent
Watanabe

(10) Patent No.: US 10,072,134 B2
(45) Date of Patent: Sep. 11, 2018

(54) POLYCARBONATE-TYPE RESIN COMPOSITION AND MOLDED ARTICLE

(71) Applicant: IDEMITSU KOSAN CO., LTD., Chiyoda-ku (JP)

(72) Inventor: Nobuhiro Watanabe, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/783,581

(22) PCT Filed: Apr. 18, 2014

(86) PCT No.: PCT/JP2014/061066
§ 371 (c)(1),
(2) Date: Oct. 9, 2015

(87) PCT Pub. No.: WO2014/171540
PCT Pub. Date: Oct. 23, 2014

(65) Prior Publication Data
US 2016/0060428 A1    Mar. 3, 2016

(30) Foreign Application Priority Data

Apr. 19, 2013    (JP) .................. 2013-088403

(51) Int. Cl.
*C08L 69/00*    (2006.01)
*C08L 83/10*    (2006.01)
*C08G 77/448*    (2006.01)
*C08K 5/357*    (2006.01)

(52) U.S. Cl.
CPC .............. *C08K 5/357* (2013.01); *C08L 69/00* (2013.01); *C08L 83/10* (2013.01); *C08G 77/448* (2013.01)

(58) Field of Classification Search
CPC ....... C08G 77/448; C08L 83/06; C08L 83/10; C08L 69/00
See application file for complete search history.

(56) References Cited

U.S. PATENT DOCUMENTS

| | | | | |
|---|---|---|---|---|
| 6,486,241 B2 * | 11/2002 | Sawano | .................. | C08L 25/12 524/109 |
| 2001/0039313 A1 * | 11/2001 | Ogawa | ................. | C08G 77/448 525/196 |
| 2003/0096889 A1 | 5/2003 | Sarkar | | |
| 2005/0148710 A1 * | 7/2005 | Dean | .......................... | C08J 5/18 524/155 |
| 2006/0004154 A1 * | 1/2006 | DeRudder | ............. | C08F 279/04 525/469 |
| 2007/0257401 A1 * | 11/2007 | Nakagawa | .............. | C08L 69/00 264/328.1 |
| 2012/0108739 A1 | 5/2012 | Ishikawa et al. | | |
| 2012/0252941 A1 | 10/2012 | Ibusuki et al. | | |
| 2012/0305863 A1 | 12/2012 | Togashi et al. | | |
| 2013/0018115 A1 | 1/2013 | Isozaki et al. | | |
| 2014/0106208 A1 | 4/2014 | Ishikawa et al. | | |
| 2014/0303296 A1 * | 10/2014 | Inazawa | ................... | C08K 3/34 524/127 |
| 2015/0166733 A1 * | 6/2015 | Nagao | ..................... | C08L 83/10 525/474 |

FOREIGN PATENT DOCUMENTS

| | | | |
|---|---|---|---|
| EP | 2 311 911 A1 | 4/2011 | |
| EP | 2 716 713 A1 | 4/2014 | |
| JP | 8 27978 B2 | 3/1996 | |
| JP | 2662049 B2 | 10/1997 | |
| JP | 10067850 A | * | 3/1998 |
| JP | 2005 507006 A | 3/2005 | |
| JP | 2011 168636 A | 9/2011 | |
| JP | 2011 207954 A | 10/2011 | |
| JP | 2011-246530 A | 12/2011 | |
| JP | 2012-25819 A | 2/2012 | |
| JP | 2012-153824 A | 8/2012 | |
| JP | 2012 246430 A | 12/2012 | |
| JP | 2014-210872 | 11/2014 | |
| WO | 2011 064897 A1 | 6/2011 | |
| WO | WO 2012/165373 A1 | 12/2012 | |

OTHER PUBLICATIONS

Machine translated English language equivalent of JP 10-067850 (Mar. 1998, 8 pages).*
Japanese Office Action dated Jan. 26, 2016 in Patent Application No. 2015-220168 (without English Translation).
Combined Office Action and Search Report dated May 31, 2016 in Chinese Patent Application No. 201480021992.4 (with English translation of Categories of Cited Documents).
Extended European Search Report dated Sep. 15, 2016 Application No. 14786064.7.
International Search Report dated Jul. 1, 2014 in PCT/JP14/061066 Filed Apr. 18, 2014.
Third Party Submission dated May 12, 2016, in Japanese Patent Application No. 2015-220168.

* cited by examiner

Primary Examiner — Brieann R Johnston
(74) Attorney, Agent, or Firm — Oblon, McClelland, Maier & Neustadt, L.L.P.

(57) ABSTRACT

Provided is a polycarbonate-based resin composition, including: (A) a polycarbonate-based resin including 10 mass % to 100 mass % of a specific polycarbonate-polyorganosiloxane copolymer (A-1) and 0 mass % to 90 mass % of a polycarbonate (A-2) except the copolymer (A-1); and (B) an additive, the polycarbonate-based resin composition containing sodium at a content of 0.5 ppm or less.

20 Claims, No Drawings

POLYCARBONATE-TYPE RESIN COMPOSITION AND MOLDED ARTICLE

TECHNICAL FIELD

The present invention relates to a polycarbonate-based resin composition and a molded body obtained by molding the composition.

BACKGROUND ART

A polycarbonate resin has been used in a wide variety of applications because the resin has excellent characteristics such as transparency, a high impact characteristic, and flame retardancy. However, when the resin is used in an application where the resin is exposed to UV light such as the outdoors, a problem in which the resin turns yellow due to the UV light occurs. Various technologies each involving blending the resin with a UV absorber to suppress the yellowing have been developed.

Meanwhile, in recent years, a polycarbonate-polydimethylsiloxane copolymer (sometimes referred to as "PC-PDMS copolymer") has been given as an example of a polycarbonate resin material suitable for requirements for a high degree of low-temperature impact characteristic, excellent flame retardancy, and transparency. However, it is difficult to meet sophisticated requirements in the market with the PC-PDMS copolymer alone, and hence it has started to become necessary to blend the copolymer with various additives to impart sophisticated functions to the copolymer.

The impartment of the sophisticated functions to the PC-PDMS copolymer through the blending of the copolymer with the various additives has caused problems because the following trouble occurs. A phenomenon in which the PC-PDMS copolymer becomes clouded occurs at the time of the impartment to impair excellent transparency or weatherability of the copolymer.

It has been known from Patent Literature 1 and Patent Literature 2 that when a homopolycarbonate resin using bisphenol A as a monomer component is used as an optical disk substrate, an optical information recording medium having a low bit error ratio can be obtained by setting the amount of sodium remaining in the polycarbonate resin to 1 ppm or less. However, an influence of sodium remaining in a resin composition obtained by adding the various additives to the PC-PDMS copolymer has not been known.

As a result of their extensive investigations, the inventors of the present invention have found that when sodium contents in the various additives are large, a phenomenon in which the PC-PDMS copolymer becomes clouded occurs, and thus have completed the present invention.

CITATION LIST

Patent Literature

PTL 1: JP 8-27978 B2
PTL 2: JP 2662049 B2

SUMMARY OF INVENTION

Technical Problem

An object of the present invention is to provide a polycarbonate-based resin composition, comprising a blend of a polycarbonate-based resin containing a polycarbonate-polyorganosiloxane copolymer (sometimes referred to as "PC-POS copolymer"), and an additive, the polycarbonate-based resin composition being reduced in phenomenon in which the composition becomes clouded, and being excellent in transparency, weatherability, and impact resistance, and a molded body obtained by molding the composition.

Solution to Problem

The inventors of the present invention have made extensive investigations, and as a result, have completed the present invention by setting the content of sodium in a polycarbonate-based resin composition, comprising a blend of a polycarbonate-based resin containing a PC-POS copolymer, and an additive, to a specific amount or less.

That is, the present invention relates to the following items [1] to [12].

[1] A polycarbonate-based resin composition, comprising a blend of: (A) a polycarbonate-based resin comprising 10 mass % to 100 mass % of a polycarbonate-polyorganosiloxane copolymer (A-1) comprising, in a main chain thereof, a repeating unit represented by the general formula (I) and a repeating unit represented by the general formula (II), wherein n=10 to 500, the copolymer having a content of the repeating unit represented by the general formula (II) of from 1.0 mass % to 10.0 mass %, and 0 mass % to 90 mass % of a polycarbonate (A-2) except the copolymer (A-1); and (B) an additive, wherein a content of sodium in the polycarbonate-based resin composition is 0.5 ppm or less:

[Chem. 1]

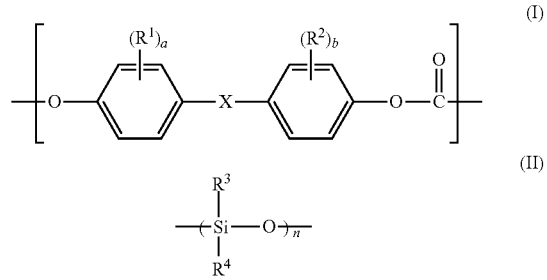

wherein:
$R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and a and b each independently represent an integer of from 0 to 4; and
$R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and n represents an average number of repetitions.

[2] The polycarbonate-based resin composition according to the item [1], wherein a blending amount of the component (B) is from 0.01 part by mass to 5 parts by mass relative to 100 parts by mass of the polycarbonate-based resin.

[3] The polycarbonate-based resin composition according to the item [1] or [2], wherein the component (B) contains sodium.
[4] The polycarbonate-based resin composition according to any one of the items [1] to [3], wherein an L* value in a CIE 1976 (L*, a*, b*) color space measured by using a flat test piece having a thickness of 2 mm, the flat test piece being produced by molding the polycarbonate-based resin composition at a cylinder temperature of a molding machine of 280° C., a die temperature of 80° C., and a molding cycle of 30 seconds, is 50 or more.
[5] The polycarbonate-based resin composition according to any one of the items [1] to [4], wherein the component (B) comprises a UV absorber.
[6] The polycarbonate-based resin composition according to the item [5], wherein the UV absorber is a compound represented by the following general formula (1) and has a sodium content of 40 ppm or less:

[Chem. 2]

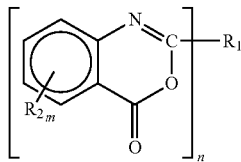
(1)

wherein $R_1$ represents a residue obtained by removing n hydrogen atoms from a hydrocarbon compound having 1 or 2 aromatic rings in a molecule thereof, $R_2$ represents hydrogen, a halogen group, a nitro group, an alkyl group having 1 to 8 carbon atoms, an alkoxyl group having 1 to 8 carbon atoms, or an alkenyloxy group having 2 to 8 carbon atoms, n represents an integer of 2 or 3, and m represents an integer of from 1 to 4.
[7] The polycarbonate-based resin composition according to the item [5] or [6], wherein the UV absorber is p-phenylenebis(1,3-benzoxazin-4-one).
[8] The polycarbonate-based resin composition according to any one of the items [5] to [7], wherein a blending amount of the UV absorber is from 0.05 part by mass to 0.5 part by mass relative to 100 parts by mass of the polycarbonate-based resin.
[9] The polycarbonate-based resin composition according to any one of the items [5] to [7], wherein a blending amount of the UV absorber is from 0.2 part by mass to 3 parts by mass relative to 100 parts by mass of the polycarbonate-based resin.
[10] A molded body, which is produced by molding the polycarbonate-based resin composition according to any one of the items [1] to [9].
[11] An injection-molded molded body, which is produced by subjecting the polycarbonate-based resin composition of the item [8] to injection molding.
[12] A sheet-shaped molded body, which is produced by subjecting the polycarbonate-based resin composition of the item [9] to extrusion molding.

Advantageous Effects of Invention

The polycarbonate-based resin composition of the present invention can provide a molded body having excellent transparency, weatherability, and impact resistance.

DESCRIPTION OF EMBODIMENTS

A polycarbonate-based resin composition of the present invention is a polycarbonate-based resin composition, comprising (A) a polycarbonate-based resin comprising the following specific components, and (B) an additive, the polycarbonate-based resin composition containing sodium at a content of 0.5 ppm or less.
Now, the components to be incorporated into the polycarbonate-based resin composition of the present invention are described in detail. In this description, a provision considered to be preferred can be arbitrarily adopted and a combination of preferred provisions can be said to be more preferred.
[(A) Polycarbonate-Based Resin]
<PC-POS Copolymer (A-1)>
A polycarbonate-based resin as a component (A) is formed of 10 mass % to 100 mass % of a PC-POS copolymer (A-1) comprising, in a main chain thereof, a repeating unit represented by the general formula (I) and a repeating unit represented by the general formula (II), wherein n=10 to 500, the copolymer having a content of the repeating unit represented by the general formula (II) of from 1.0 mass % to 10.0 mass %, and 0 mass % to 90 mass % of a polycarbonate (A-2) except the copolymer (A-1). Now, description of the PC-POS copolymer (A-1) is given.

[Chem. 3]

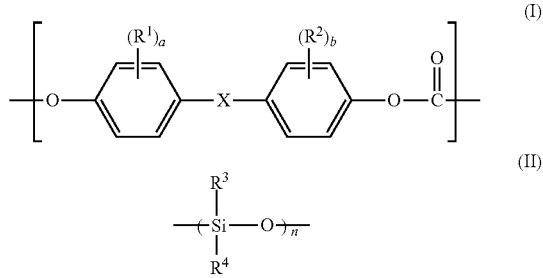

[In the formulae, $R^1$ to $R^4$, X, a, b, and n are the same as those described in the foregoing.]
Examples of the halogen atom that $R^1$ and $R^2$ in the general formula (I) each independently represent include a fluorine atom, a chlorine atom, a bromine atom, and an iodine atom.
Examples of the alkyl group that $R^1$ and $R^2$ each independently represent include a methyl group, an ethyl group, a n-propyl group, an isopropyl group, various butyl groups ("various" means that a linear group and any branched group are included, and the same shall apply hereinafter), various pentyl groups, and various hexyl groups. An example of the alkoxy group that $R^1$ and $R^2$ each independently represent is an alkoxy group whose alkyl group moiety is the alkyl group described above.
$R^1$ and $R^2$ each preferably represent an alkyl group having 1 to 6 carbon atoms or an alkoxy group having 1 to 6 carbon atoms.
Examples of the alkylene group represented by X include a methylene group, an ethylene group, a trimethylene group, a tetramethylene group, and a hexamethylene group, and an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group, and a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group, a cycloalkylidene group having 5 to 10 carbon atoms is preferred, and a cycloalkylidene group having 5 to 8 carbon atoms is more preferred. The arylalkylene group represented by X is a divalent linking group in which an aryl moiety and an alkyl moiety are bonded to each other, and examples of the aryl moiety include aryl groups each having 6 to 14 ring-forming carbon atoms such as a phenyl group, a naphthyl group, a biphenyl group, and an anthryl group. As an aryl moiety of the arylalkylidene group represented by X, there are given, for example, aryl groups each having 6 to 14 ring-forming carbon atoms such as a phenyl group, a naphthyl group, a biphenyl group, and an anthryl group.

a and b each independently represent an integer of from 0 to 4, preferably from 0 to 2, and more preferably 0 or 1.

Examples of the halogen atom that $R^3$ and $R^4$ in the general formula (II) each independently represent include a fluorine atom, a chlorine atom, a bromine atom, and an iodine atom. Examples of the alkyl group or alkoxy group that $R^3$ and $R^4$ each independently represent include the same examples as those in the case of $R^1$ and $R^2$. Examples of the aryl group that $R^3$ and $R^4$ each independently represent include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

The content of the repeating unit represented by the general formula (II) in the PC-POS copolymer used in the present invention needs to be from 1.0 mass % to 10.0 mass %, and is preferably from 2.2 mass % to 8.2 mass %, more preferably from 3.2 mass % to 6.7 mass %. When the content of the block portion is less than 1.0 mass %, an effect on the notch sensitivity is small and an improving effect on the falling impact strength (in particular, low-temperature impact resistance) is insufficient. When the content is more than 10 mass %, a reduction in heat resistance enlarges.

The chain length of a polyorganosiloxane block portion having the structural unit represented by the general formula (II) needs to be from 10 to 500, and is preferably from 22 to 127, more preferably from 32 to 97. When the chain length is less than 10, the effect on the notch sensitivity is small and the improving effect on the falling impact strength (in particular, the low-temperature impact resistance) is insufficient. When the chain length is more than 500, there is a risk in that the transparency of the PC-POS copolymer is adversely affected and hence the transparency of the polycarbonate-based resin composition of the present invention to be obtained reduces.

A structure containing a repeating unit represented by the general formula (II) is preferably a structure represented by the following general formula (II').

[Chem. 4]

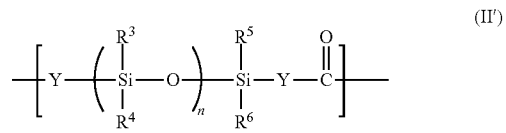

In the formula (II'), $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms. Y represents a single bond, or an organic residue containing an aliphatic or aromatic group, and n represents an average number of repetitions.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms. Y preferably represents a residue of a phenol-based compound having an alkyl group, and more preferably represents an organic residue derived from allylphenol or an organic residue derived from eugenol.

In addition, the structure containing a repeating unit represented by the general formula (II) is preferably the following formula (II").

[Chem. 5]

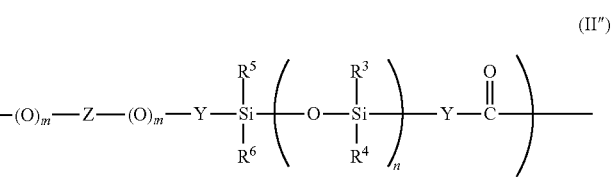

In the formula (II"), $R^3$ to $R^6$, Y, and n are identical to those in the general formula (II'), and preferred ones thereof are also the same as those in the formula.

m represents 0 or 1.

Z represents a halogen, —$R^7$OH, —$R^7$COOH, —$R^7$NH$_2$, —COOH, or —SH as in Z in the general formula (2) that appears later, and the $R^7$ represents a linear, branched, or cyclic alkylene group, an aryl-substituted alkylene group, an aryl-substituted alkylene group that may have an alkoxy group on a ring thereof, or an arylene group.

In addition, β represents a divalent group derived from a diisocyanate compound. Specific examples of the divalent group derived from a diisocyanate compound are described later.

The PC-POS copolymer (A-1) has a viscosity-average molecular weight (Mv) of preferably from 14,000 to 28,000, more preferably from 15,500 to 25,500, still more preferably from 16,000 to 23,500, particularly preferably from 16,200 to 22,500. As long as the viscosity-average molecular weight of the PC-POS copolymer (A-1) falls within the range, the impact resistance of a molded body thereof becomes sufficient, the viscosity of the PC-POS copolymer does not become excessively large and productivity at the time of its production becomes stable, and the PC-POS copolymer can be easily molded into a thin body.

The viscosity-average molecular weight (Mv) is a value calculated from Schnell's equation ($[\eta]=1.23\times10^{-5}\times Mv^{0.83}$) by measuring the limiting viscosity $[\eta]$ of a methylene chloride solution at 20° C.

A method of producing the PC-POS copolymer (A-1) is not particularly limited, and the PC-POS copolymer can be easily produced with reference to a known production method for a PC-POS copolymer such as a method described in JP 2010-241943 A.

Specifically, the PC-POS copolymer can be produced by: dissolving an aromatic polycarbonate oligomer produced in advance and a polyorganosiloxane having a reactive group at a terminal thereof in a water-insoluble organic solvent (such as methylene chloride); adding an aqueous alkaline compound solution (such as aqueous sodium hydroxide) of a dihydric phenol-based compound (such as bisphenol A) to the solution; and subjecting the mixture to an interfacial polycondensation reaction through the use of a tertiary amine (such as triethylamine) or a quaternary ammonium salt (such as trimethylbenzylammonium chloride) as a polymerization catalyst in the presence of a terminal stopper (a monohydric phenol such as p-t-butylphenol). The contents of the repeating units each containing a structure represented by the general formula (II) can be adjusted to fall within the ranges by, for example, adjusting the usage amount of the polyorganosiloxane.

After the interfacial polycondensation reaction, the resultant is appropriately left at rest to be separated into an aqueous phase and a water-insoluble organic solvent phase [separating step], the water-insoluble organic solvent phase is washed (preferably washed with a basic aqueous solution, an acidic aqueous solution, and water in the stated order) [washing step], and the resultant organic phase is concentrated [concentrating step], pulverized [pulverizing step], and dried [drying step]. Thus, the PC-POS copolymer (A-1) can be obtained.

In addition, the PC-POS copolymer (A-1) can be produced by copolymerizing a dihydric phenol represented by the following general formula (1), a polyorganosiloxane represented by the following general formula (2), and phosgene, a carbonate ester, or a chloroformate.

[Chem. 6]

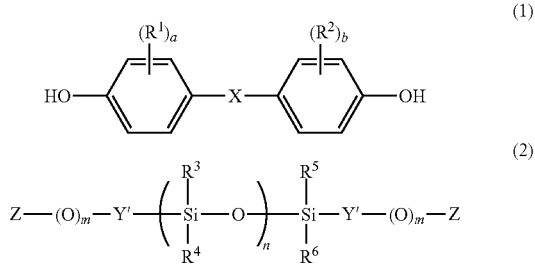

Here, in the general formula (1), $R^1$ and $R^2$, X, a, and b are the same as those in the general formula (I), and in the general formula (2), $R^3$ to $R^6$ are the same as those in the general formula (II'), n is the same as that in the general formula (II), and Y' is the same as Y in the general formula (II').

m represents 0 or 1, Z represents a halogen, —$R^7$OH, —$R^7$COOH, —$R^7$NH$_2$, —COOH, or —SH, and $R^7$ represents a linear, branched, or cyclic alkylene group, an aryl-substituted alkylene group, an aryl-substituted alkylene group that may have an alkoxy group on a ring thereof, or an arylene group.

Y' preferably represents a single bond, or an organic residue including an aliphatic group or an aromatic group, the organic residue being bonded to Si and O or to Si and Z. $R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms. n is the same as that in the foregoing, and m represents 0 or 1.

Z preferably represents —$R^7$OH, —$R^7$COOH, —$R^7$NH$_2$, —COOH, or —SH. The $R^7$ is the same as that in the foregoing and represents a linear, branched, or cyclic alkylene group, an aryl-substituted alkylene group, an aryl-substituted alkylene group that may have an alkoxy group on a ring thereof, or an arylene group.

The dihydric phenol represented by the general formula (1) as a raw material for the PC-POS copolymer (A-1) is not particularly limited, but is suitably 2,2-bis(4-hydroxyphenyl)propane [popular name: bisphenol A]. When bisphenol A is used as the dihydric phenol, in the resultant PC-POS, X represents an isopropylidene group and a=b=0 in the general formula (I).

Examples of the dihydric phenol except bisphenol A include: bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylethane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentane.

One kind of those dihydric phenols may be used alone, or two or more kinds thereof may be used as a mixture.

The polyorganosiloxane represented by the general formula (2) can be easily produced by subjecting a phenol having an olefinically unsaturated carbon-carbon bond (preferably vinylphenol, allylphenol, eugenol, isopropenylphenol, or the like), to a hydrosilanation reaction with a terminal of a polyorganosiloxane chain having a predetermined polymerization degree (n; number of repetitions). The phenol is more preferably allylphenol or eugenol.

The polyorganosiloxane represented by the general formula (2) is preferably one in which $R^3$ to $R^6$ each represent a methyl group.

Examples of the polyorganosiloxane represented by the general formula (2) include compounds represented by the following general formulae (2-1) to (2-9).

First, cyclotrisiloxane and disiloxane are caused to react with each other in the presence of an acid catalyst to synthesize an α,ω-dihydrogen organopolysiloxane. At this time, an α,ω-dihydrogen organopolysiloxane having a desired average repeating unit can be synthesized by changing a blending ratio between cyclotrisiloxane and disiloxane. Subsequently, the α,ω-dihydrogen organopolysiloxane is subjected to an addition reaction with a phenol compound

[Chem. 7]

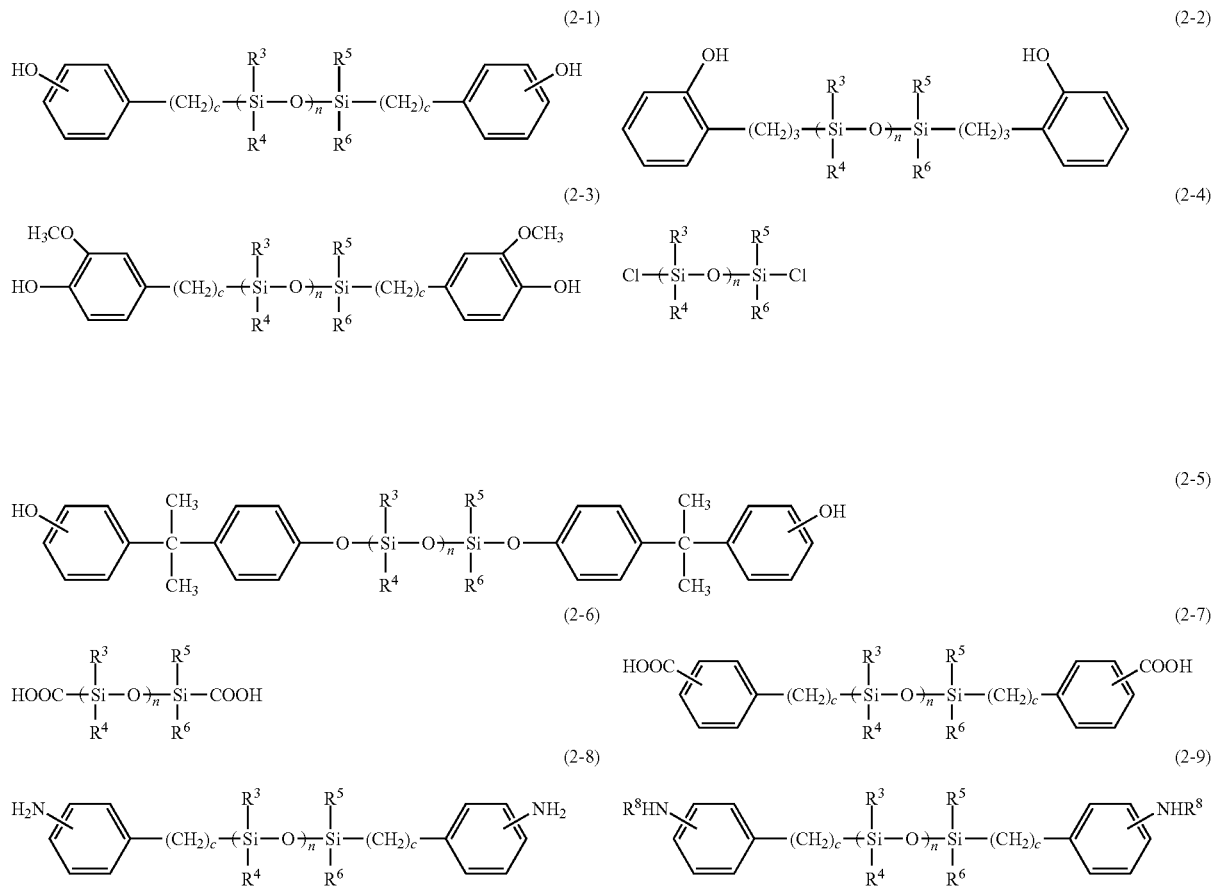

In the general formulae (2-1) to (2-9), $R^3$ to $R^6$, and n are as defined in the foregoing, and preferred ones thereof are also the same as those in the foregoing. In addition, $R^8$ represents an alkyl group, an alkenyl group, an aryl group, or an aralkyl group, and c represents a positive integer and typically represents an integer of from 1 to 6.

In addition, $R^8$ preferably represents an alkyl group, an alkenyl group, an aryl group, or an aralkyl group.

Among them, a phenol-modified polyorganosiloxane represented by the general formula (2-1) is preferred from the viewpoint of its ease of polymerization. In addition, an α,ω-bis[3-(o-hydroxyphenyl)propyl]polydimethylsiloxane as one kind of compound represented by the general formula (2-2) or an α,ω-bis[3-(4-hydroxy-3-methoxyphenyl)propyl] polydimethylsiloxane as one kind of compound represented by the general formula (2-3) is preferred from the viewpoint of its ease of availability.

The phenol-modified polyorganosiloxane can be produced by a known method. For example, the following method is given as the production method.

having an unsaturated aliphatic hydrocarbon group such as allylphenol or eugenol in the presence of a catalyst for a hydrosilylation reaction, whereby a phenol-modified polyorganosiloxane having a desired average repeating unit can be produced.

In addition, at this stage, a cyclic polyorganosiloxane having a low molecular weight and an excessive amount of the phenol compound remain as impurities. Accordingly, those low-molecular weight compounds are preferably removed by distillation with heating under reduced pressure.

Further, the PC-POS copolymer (A-1) may be a copolymer produced by copolymerizing, the dihydric phenol represented by the general formula (1), a polyorganosiloxane represented by the following general formula (3). and phosgene, a carbonate ester, or a chloroformate. The general formula (3) represents a product of a reaction between the polyorganosiloxane represented by the general formula (2) and a diisocyanate compound.

[Chem. 8]

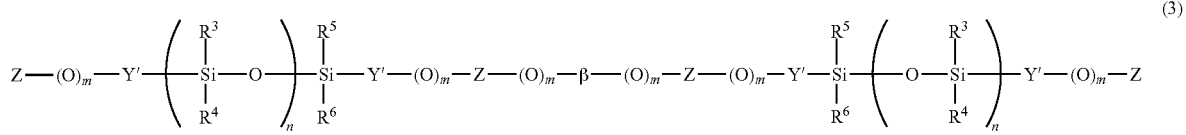

(3)

In the general formula (3), $R^3$ to $R^6$, n, m, Y', and Z are as defined in the foregoing, and preferred ones thereof are also the same as those in the foregoing.

In addition, β represents a divalent group derived from the diisocyanate compound, and examples thereof include divalent groups represented by the following general formulae (3-1) to (3-4).

[Chem. 9]

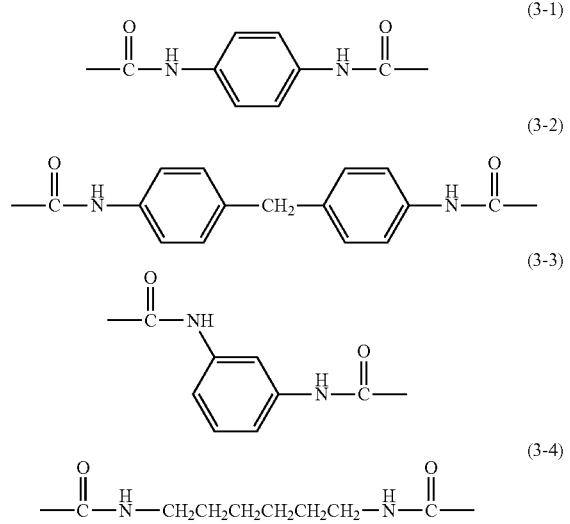

<Polycarbonate (A-2) Except (A-1)>

As described in the foregoing, the polycarbonate resin (A-2) except the component (A-1) may be contained in the component (A) to the extent that the effects of the present invention are not impaired. The component (A-2) may be an aromatic polycarbonate resin obtained by using an aromatic dihydric phenol-based compound, may be an aliphatic polycarbonate resin obtained by using an aliphatic dihydric phenol-based compound, may be an aliphatic polycarbonate resin obtained by using an aliphatic divalent hydroxyl group-containing compound, or may be an aromatic-aliphatic polycarbonate resin obtained by using the aromatic dihydric phenol-based compound and the aliphatic dihydric phenol-based compound in combination. The component (A-2) can be used for adjusting the contents of the repeating units each containing a structure represented by the general formula (II) in the resin mixture (A).

Among them, an aromatic polycarbonate resin is preferred as the component (A-2).

The viscosity-average molecular weight of the polycarbonate-based resin as the component (A-2) is preferably from 10,000 to 40,000, more preferably from 13,200 to 26,700, still more preferably 15,500 to 23,200 in terms of physical properties.

The aromatic polycarbonate resin is preferably as follows: the resin is free of a repeating unit containing a structure represented by the general formula (II) and its main chain is formed of a repeating unit represented by the following general formula (III). Such aromatic polycarbonate resin is not particularly limited, and any one of the various known aromatic polycarbonate resins can be used.

[Chem. 10]

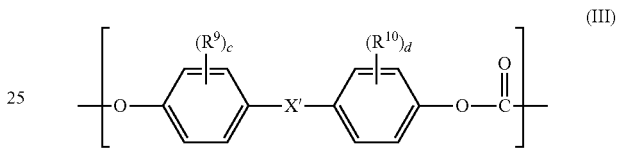

(III)

[In the formula, $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and c and d each independently represent an integer of from 0 to 4.]

Specific examples of $R^9$ and $R^{10}$ include the same examples as those of $R^1$ and $R^2$, and preferred ones thereof are also the same as those of $R^1$ and $R^2$. $R^9$ and $R^{10}$ each more preferably represent an alkyl group having 1 to 6 carbon atoms or an alkoxy group having 1 to 6 carbon atoms. Specific examples of X' include the same examples as those of X, and preferred ones thereof are also the same as those of X. c and d each independently represent preferably from 0 to 2, more preferably 0 or 1.

Specifically, a resin obtained by a conventional production method for an aromatic polycarbonate can be used as the aromatic polycarbonate resin. Examples of the conventional method include: an interfacial polymerization method involving causing the aromatic dihydric phenol-based compound and phosgene to react with each other in the presence of an organic solvent inert to the reaction and an aqueous alkaline solution, adding a polymerization catalyst such as a tertiary amine or a quaternary ammonium salt to the resultant, and polymerizing the mixture; and a pyridine method involving dissolving the aromatic dihydric phenol-based compound in pyridine or a mixed solution of pyridine and an inert solvent, and introducing phosgene to the solution to directly produce the resin.

A molecular weight regulator (terminal stopper), a branching agent, or the like is used as required at the time of the reaction.

The aromatic dihydric phenol-based compound is, for example, a compound represented by the following general formula (III').

[Chem. 11]

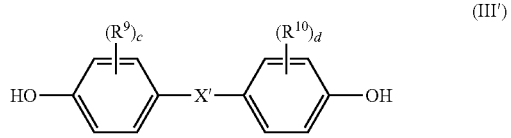

[In the formula, $R^9$, $R^{10}$, X', c, and d are as defined in the foregoing, and preferred ones thereof are also the same as those in the foregoing.]

Specific examples of the aromatic dihydric phenol-based compound include bis(hydroxyphenyl)alkane-based dihydric phenols such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane, 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone.

Among them, bis(hydroxyphenyl)alkane-based dihydric phenols are preferred, and bisphenol A is more preferred.

One kind of the aromatic polycarbonate resins may be used alone, or two or more kinds thereof may be used in combination.

In addition, the aliphatic polycarbonate resin can be produced by using the aliphatic divalent hydroxyl group-containing compound or the aliphatic dihydric phenol-based compound instead of the aromatic dihydric phenol-based compound.

The aromatic-aliphatic polycarbonate resin can be produced by using the aromatic dihydric phenol-based compound and the aliphatic dihydric phenol-based compound in combination as described in the foregoing.

<Ratios of Component (A-1) and Component (A-2)>

The polycarbonate-based resin as the component (A) needs to contain the PC-POS copolymer (A-1) at a ratio of from 10 mass % to 100 mass % and the polycarbonate (A-2) except the copolymer (A-1) at a ratio of from 0 mass % to 90 mass %. A ratio of the component (A-1) of less than 10 mass % is not preferred because the impact resistance of the composition, in particular, its impact resistance under low temperature reduces. The ratios of the component (A-1) and the component (A-2) can be arbitrarily adjusted so that the content of the repeating unit represented by the general formula (II) in the component (A-1) relative to a total amount of the component (A-1) and the component (A-2) of 100 mass % may be from 1.0 mass % to 10.0 mass %. The resin to be used preferably comprises a blend of the component (A-1) and the component (A-2) at ratios in the ranges of from 30 mass % to 100 mass % and from 0 mass % to 70 mass %, respectively.

[Additive (B)]

In the polycarbonate-based resin composition of the present invention, the additive as the component (B) is blended into the polycarbonate-based resin as the component (A). The additive as the component (B) is not particularly limited as long as the additive is blended into a polycarbonate-based resin and does not impair the transparency of the polycarbonate-based resin, and examples thereof include a UV absorber, an antioxidant, a flame retardant, a flame retardant aid, a light stabilizer, a plasticizer, an antistatic agent, an antiblocking agent, an antimicrobial agent, a compatibilizer, a colorant (dye or pigment), a release agent, and a lubricant.

It is desired that the additive (B) be blended in an amount of from 0.01 part by mass to 5.0 parts by mass, preferably from 0.03 part by mass to 3.0 parts by mass relative to 100 parts by mass of the polycarbonate-based resin as the component (A).

The UV absorber and the antioxidant each serving as the component (B) are described below.

<UV Absorber>

Examples of the UV absorber include various compounds such as benzoxazinone-based, benzotriazole-based, salicylate-based, malonic acid ester-based, oxalanilide-based, triazine-based, benzophenone-based, or cyanoacrylate-based compounds. One kind thereof may be used alone, or two or more kinds thereof may be used in combination.

An example of the benzoxazinone-based compound can be a compound represented by the following general formula (1):

[Chem. 12]

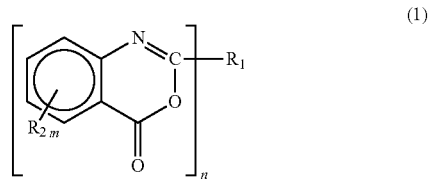

[In the formula, $R_1$ represents a residue obtained by removing n hydrogen atoms from a hydrocarbon compound having one or two aromatic rings in a molecule thereof, $R_2$ represents hydrogen, a halogen group, a nitro group, an alkyl group having 1 to 8 carbon atoms, an alkoxyl group having 1 to 8 carbon atoms, or an alkenyloxy group having 2 to 8 carbon atoms, n represents an integer of 2 or 3, and m represents an integer of from 1 to 4.

Examples of the residue obtained by removing n hydrogen atoms from a hydrocarbon compound having 1 or 2 aromatic rings in a molecule thereof, the residue being represented by $R_1$ in the general formula (1), can include arylene groups such as a phenylene group, a biphenylene group, and a naphthylene group. Examples of the alkyl group having 1 to 8 carbon atoms represented by $R_2$ can include alkyl groups such as a methyl group, an ethyl group, a propyl group, and a butyl group. Examples of the alkoxyl group having 1 to 8 carbon atoms represented by $R_2$ can include a methoxy group, an ethoxy group, a propoxy group, and a butoxy group. Examples of the alkenyloxy group having 2 to 8 carbon atoms represented by $R_2$ can include an allyloxy group, a 2-propenyloxy group, a 2-butenyloxy group, and a 2-methyl-3-propenyloxy group.

p-Phenylenebis(1,3-benzoxazin-4-one) is particularly preferred among the compounds each represented by the general formula (1). p-Phenylenebis(1,3-benzoxazin-4-one) is a compound represented by the following formula.

[Chem. 13]

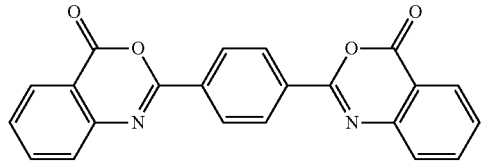

Examples of the benzotriazole-based compound include 2-(2'-hydroxy-5'-methylphenyl)benzotriazole, 2-(2'-hydroxy-5'-t-butylphenyl)benzotriazole, 2-(2'-hydroxy-5'-t-octylphenyl)benzotriazole, 2-(2'-hydroxy-3'-t-butylphenyl)benzotriazole, 2-(2'-hydroxy-3',5'-di-amylphenyl)benzotriazole, 2-(2'-hydroxy-3'-dodecyl-5'-methylphenyl)benzotriazole, 2-(2'-hydroxy-3',5'-dicumylphenyl)benzotriazole, and 2,2'-methylenebis[4-(1,1,3,3-tetramethylbutyl)-6-(2H-benzotriazol-2-yl)phenol].

Examples of the salicylate-based compound include phenyl salicylate, p-t-butylphenyl salicylate, and p-octylphenyl salicylate. Examples of the malonic acid ester-based compound include benzylidene bis(diethyl malonate) and 4-methoxyphenyl-methylene-dimethyl ester. An example of the oxalanilide-based compound is an oxalanilide compound with a hydrocarbon group having 1 to 12 carbon atoms.

It is desired that such UV absorber be blended in an amount of from 0.1 part by mass to 3.0 parts by mass, preferably from 0.1 part by mass to 2.0 parts by mass relative to 100 parts by mass of the polycarbonate-based resin as the component (A). In particular, when an injection-molded body is obtained by molding, the amount is preferably set to from 0.1 part by mass to 0.5 part by mass, and when a sheet-shaped molded body is obtained by molding, the amount is preferably set to from 0.2 part by mass to 3 parts by mass.

<Antioxidant>

Examples of the antioxidant can include phenol-, phosphorus-, and sulfur-based antioxidants. One kind of the following antioxidants may be used alone, or two or more kinds thereof may be used as a mixture. In particular, it has been known that when the phenol-based antioxidant and the phosphorus-based antioxidant are used in combination, the effects of the antioxidants persist.

The phenol-based antioxidant is not particularly limited, and a hindered phenol-based antioxidant is suitably used. Typical examples thereof include octadecyl-3-(3,5-di-tert-butyl-4-hydroxyphenyl)propionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythrityl-tetrakis[3-(3,5-di-tert-butyl-4-hydroxyphenyl)propionate], N,N'-hexamethylenebis[(3,5-di-tert-butyl-4-hydroxy)-hydrocinnamide], 2,2-thio-diethylene bis[3-(3,5-di-tert-butyl-4-hydroxyphenyl) propionate], 2,4-bis(n-octylthio)-6-(4-hydroxy-3,5-ditert-butylanilino)-1,3,5-triazine, 1,3,5-trimethyl-2,4,6-tris(3,5-di-tert-butyl-4-hydroxybenzyl)benzene, tris-(3,5-di-tert-butyl-4-hydroxybenzyl)-isocyanurate, and calcium bis(ethyl 3,5-di-tert-butyl-4-hydroxybenzylphosphonate).

Those antioxidants are desirably blended in an amount of from 0.003 part by mass to 0.5 part by mass, preferably from 0.01 part by mass to 0.2 part by mass relative to 100 parts by mass of the polycarbonate-based resin as the component (A).

The phosphorus-based antioxidant is not particularly limited. Typical examples thereof include: tris(nonylphenyl) phosphite and 2-ethylhexyl diphenyl phosphite as well as trialkyl phosphites such as trimethyl phosphite, triethyl phosphite, tributyl phosphite, trioctyl phosphite, trinonyl phosphite, tridecyl phosphite, and trioctadecyl phosphite, distearyl pentaerythrityl diphosphite, tris(2-chloroethyl) phosphite, and tris(2,3-dichloropropyl)phosphite; tricycloalkyl phosphites such as tricyclohexyl phosphite; triaryl phosphites such as triphenyl phosphite, tricresyl phosphite, tris(ethylphenyl)phosphite, tris(butylphenyl)phosphite, tris (hydroxyphenyl)phosphite, and tris(2,4-di-tert-butylphenyl) phosphite; trialkyl phosphates such as trimethyl phosphate, triethyl phosphate, tributyl phosphate, trioctyl phosphate, tridecyl phosphate, trioctadecyl phosphate, distearyl pentaerythrityl diphosphate, tris(2-chloroethyl)phosphate, and tris(2,3-dichloropropyl)phosphate; tricycloalkyl phosphates such as tricyclohexyl-1-phosphate; and triaryl phosphates such as triphenyl phosphate, tricresyl phosphate, tris(nonylphenyl)phosphate, and 2-ethylphenyl diphenyl phosphate. Among them, triaryl phosphites and triaryl phosphates are suitably used.

<Other Additives>

As other additives, there are given, for example, hindered amine-based light stabilizers, plasticizers such as an aliphatic carboxylic acid ester-based plasticizer, a paraffin-based plasticizer, silicone oil, and polyethylene wax, and various antistatic agents, flame retardants, antiblocking agents, antimicrobial agents, compatibilizers, colorants (dyes or pigments), release agents, and lubricants.

[Amount of Sodium in Polycarbonate-Based Resin Composition]

The sodium content of the polycarbonate-based resin composition of the present invention needs to be 0.5 ppm or less. When the sodium content exceeds 0.5 ppm, the polycarbonate-based resin composition to be obtained and a molded body thereof become clouded to impair the transparency of each of the composition and the molded body, and to reduce the weatherability thereof. The sodium content is set to preferably 0.4 ppm or less, more preferably 0.1 ppm or less. In order to set the sodium content in the polycarbonate-based resin composition to 0.5 ppm or less, the polycarbonate-based resin as the component (A) having a low sodium content and the additive as the component (B) having a low sodium content need to be used. The sodium content of the polycarbonate-based resin as the component (A) having a low sodium content can be set to 0.1 ppm or less by, for example, removing impurities through washing with pure water or the like in a production process based on an interfacial method. On the other hand, some of the additives each serving as the component (B) have high sodium contents, and in the present invention, an additive having as low a sodium content as possible needs to be used. Each additive to be used as the component (B) preferably has a sodium content of 40 ppm or less, though the preferred value varies depending on its blending amount.

Further, it is preferred that the magnesium content of the polycarbonate-based resin composition of the present invention be set to 20 ppm or less, its aluminum content be set to 20 ppm or less, and its iron content be set to 20 ppm or less.

In particular, in the case where the UV absorber is used as the additive as the component (B), some commercial products have high sodium contents. In such case, the sodium content of the polycarbonate-based resin composition needs to be set to 0.5 ppm or less by reducing its blending amount to the extent possible.

p-Phenylenebis(1,3-benzoxazin-4-one) manufactured by Cytec Technology Corporation is available as a UV absorber having a sodium content of 40 ppm or less. When the UV absorber is used as the additive as the component (B) of the present invention, the foregoing UV absorber is a preferred UV absorber because sodium hydroxide is not used in its production process and hence its sodium content is low.

The heat stability of the composition can be improved by using, as the component (B) in the present invention, the antioxidant in the preferred blending amount in combination with the UV absorber.

[Kneading and Molding]

The polycarbonate-based resin composition of the present invention is obtained by kneading predetermined amounts of the component (A) and the component (B), and as required, any other component. A method for the kneading is not particularly limited and examples thereof include methods involving using a ribbon blender, a Henschel mixer, a Banbury mixer, a drum tumbler, a single-screw extruder, a twin-screw extruder, a co-kneader, and a multi-screw extruder. In general, a heating temperature during the kneading is preferably from 240° C. to 330° C., more preferably from 250° C. to 320° C.

The polycarbonate-based resin composition produced by the method has an L* value in L*a*b* measurement in conformity with the CIE 1976 standard to be described in Examples of preferably 50 or more, more preferably 65 or more, still more preferably 80 or more, most preferably 90 or more. An upper limit for the L* value, which is not particularly limited, can be, for example, 99 or less, 97 or less, or 96 or less from the viewpoint of the ease with which the composition is produced.

Various conventionally known molding methods such as an injection molding method, an injection compression molding method, an extrusion molding method, a blow molding method, a press molding method, a vacuum molding method, and an expansion molding method can be employed for the molding.

A component to be incorporated except the polycarbonate-based resin can be melted and kneaded with the polycarbonate-based resin in advance, i.e., can be added as a master batch.

In addition, the polycarbonate-based resin composition is preferably pelletized and then subjected to injection molding to provide an injection-molded body. A general injection molding method or a general injection compression molding method, or a special molding method such as a gas-assisted molding method can be employed for the injection molding. Thus, various molded bodies can be produced.

Further, the polycarbonate-based resin composition is preferably pelletized and then subjected to extrusion molding to provide a sheet-shaped molded body. In order to subject the composition to extrusion molding to provide the sheet-shaped molded body, the sheet-shaped molded body can be produced with a known extrusion molding machine such as a T-die extruder.

When the molded body of the present invention is used as an external appearance member, a molding technology for improving an external appearance such as a heat cycle molding method, a high-temperature mold, or an insulated runner mold can also be employed.

In addition, when a part is required to be made flame-retardant, a molding technology such as laminate molding or two-color molding with a resin material having flame retardancy can also be employed.

In order to obtain a large and thin injection-molded body, injection compression molding, or high-pressure or ultra-high-pressure injection molding can be employed, and partial compression molding or the like can also be employed in the molding of a molded body having a partial thin portion.

The molded body of the present invention is used for, for example, housings and various parts of OA equipment, household appliances, and electrical and electronic equipment such as a copying machine, a facsimile, a television, a radio, a tape recorder, a video cassette recorder, a personal computer, a printer, a telephone, an information terminal, a refrigerator, and a microwave oven.

EXAMPLES

The present invention is described in more detail by way of Examples. However, the present invention is by no means limited by these Examples.

Performance tests for resin compositions obtained in Examples were performed as described below.

(1) Sodium Content

A sodium content was determined by calculation from the remaining amount of sodium determined by inductively coupled plasma spectrometry (ICP) and the amount of each component blended into the composition.

(2) Viscosity Number

The viscosity number of a pellet granulated with a uniaxial extruder "NVC-50" manufactured by Nakatani Machinery Ltd. at a cylinder temperature of 280° C. was measured in conformity with ISO 1628.

(3) L*a*b* Values

A molded article having a thickness of 2 mm was produced from the resin composition with an injection molding machine "EC-40" manufactured by Toshiba Machine Co., Ltd. at a cylinder temperature of 280° C., a the temperature of 80° C., and a molding cycle of 30 seconds, and its L*a*b* values were measured on the basis of the colorimetry of CIE 1976 (L*a*b*) by using a C2 light source according to a transmission method. L* is an indicator representing brightness, and a* and b* are psychometric chroma coordinates. When the a* becomes positive, the molded article becomes reddish. When the a* becomes negative, the molded article becomes greenish. When the b* becomes positive, the molded article becomes yellowish. When the b* becomes negative, the molded article becomes bluish.

(4) Weatherability Test: Change in L* Value

A test piece (size: 40 mm×30 mm×2 mm) was left to stand in a sunshine weather meter (SUGA SUNSHINE SUPER LONG-LIFE WEATHER) set to a black panel temperature of 63° C., a humidity of 50%, a rainfall cycle of 12/60 minutes (a rainfall duration out of 60 minutes was 12 minutes), and an irradiation intensity (300 nm to 400 nm) of 78.5 W/m$^2$ for 2,040 hours. After that, the test piece was removed and its L* value was measured by the same method as that of the section (3). A difference between the measured L* value and the L* value obtained in the section (3) was defined as ΔL*. The ΔL* represents a difference between indicators representing the brightness of the test piece before the weatherability test and that after the weatherability test.

(5) IZOD Impact Value (IZOD): Impact Resistance

A test piece having a thickness of ⅛ inch was subjected to a notched IZOD impact test in conformity with ASTM D256 at 23° C.

(6) Light Transmittance: Total Light Transmittance, Diffuse Light Transmittance, and Parallel Light Transmittance As light transmittances, the total light transmittance, diffuse light transmittance, and parallel light transmittance of a flat plate having a thickness of 2 mm obtained by injection molding were measured with a transmittance-measuring device in conformity with ISO 14782 (NDH-300A, manufactured by Nippon Denshoku Industries Co., Ltd.). The parallel light transmittance is a transmittance for a light beam that has passed through the flat plate while being coaxial with incident light, and the sum of the parallel light transmittance and the diffuse light transmittance is the total light transmittance.

Production Example 1

[Production of Polycarbonate Oligomer]

Sodium dithionite was added in an amount of 2,000 ppm relative to bisphenol A (BPA) to be dissolved later to 5.6 mass % aqueous sodium hydroxide, and BPA was dissolved in the mixture so that a BPA concentration became 13.5 mass %. Thus, a solution of BPA in aqueous sodium hydroxide was prepared.

The solution of BPA in aqueous sodium hydroxide at a flow rate of 40 L/hr, methylene chloride at a flow rate of 15 L/hr, and phosgene at a flow rate of 4.0 L/hr were continuously passed through a tubular reactor having an inner diameter of 6 mm and a tube length of 30 m.

The tubular reactor had a jacket portion and the temperature of the reaction liquid was kept at 40° C. or less by passing cooling water through the jacket.

The reaction liquid that had exited the tubular reactor was continuously introduced into a baffled vessel type reactor mounted with a sweptback blade and having an internal volume of 40 L. 2.8 Liters per hour of the solution of BPA in aqueous sodium hydroxide, 0.07 L/hr of 25 mass % aqueous sodium hydroxide, 17 L/hr of water, and 0.64 L/hr of a 1 mass % aqueous solution of triethylamine were further added to the reactor to perform a reaction. An aqueous phase was separated and removed by continuously extracting the reaction liquid overflowing the vessel type reactor and leaving the reaction liquid at rest. Thus, a methylene chloride phase was collected.

The polycarbonate oligomer thus obtained had a concentration of 329 g/L and a chloroformate group concentration of 0.74 mol/L.

Production Example 2

[Production of Polycarbonate-Polydimethylsiloxane Copolymer-1 PC-PDMS Copolymer-1]

15 Liters of the polycarbonate oligomer solution produced in the foregoing, 9.0 L of methylene chloride, 384 g of a polydimethylsiloxane with allylphenol-modified terminal (PDMS) having a number of repetitions of a dimethylsiloxane unit of 40, and 8.8 mL of triethylamine were loaded into a 50-L vessel type reactor mounted with a baffle board, a paddle type stirring blade, and a cooling jacket. 1,389 Grams of 6.4 mass % aqueous sodium hydroxide was added to the mixture under stirring to perform a reaction between the polycarbonate oligomer and the PDMS with allylphenol-modified terminal for 10 minutes.

A solution of p-t-butylphenol (PTBP) in methylene chloride (prepared by dissolving 132 g of PTBP in 2.0 L of methylene chloride) and a solution of BPA in aqueous sodium hydroxide (prepared by dissolving 1,012 g of BPA in an aqueous solution prepared by dissolving 577 g of NaOH and 2.0 g of sodium dithionite in 8.4 L of water) were added to the polymerization liquid to perform a polymerization reaction for 50 minutes.

10 Liters of methylene chloride was added to the resultant for dilution and the mixture was stirred for 10 minutes. After that, the mixture was separated into an organic phase containing a polycarbonate-polydimethylsiloxane copolymer, and an aqueous phase containing excess amounts of BPA and NaOH, and the organic phase was isolated.

The solution of the polycarbonate-polydimethylsiloxane copolymer in methylene chloride thus obtained was sequentially washed with 0.03 mol/L aqueous NaOH and 0.2 mol/L hydrochloric acid in amounts of 15 vol % each relative to the solution. Subsequently, the solution was repeatedly washed with pure water until an electric conductivity in an aqueous phase after the washing became 0.01 µS/m or less.

The solution of the polycarbonate-polydimethylsiloxane copolymer in methylene chloride obtained by the washing was concentrated and pulverized, and the resultant flake was dried under reduced pressure at 120° C.

The resultant polycarbonate-polydimethylsiloxane copolymer had a PDMS block portion content determined by nuclear magnetic resonance (NMR) of 6.0 mass %, a viscosity number measured in conformity with ISO 1628-4 (1999) of 49.5, and a viscosity-average molecular weight Mv of 18,500.

Production Example 3

[Production of Polycarbonate-Polydimethylsiloxane Copolymer-2 PC-PDMS Copolymer-2]

15 Liters of the polycarbonate oligomer solution produced in the foregoing, 9.0 L of methylene chloride, 384 g of a polydimethylsiloxane with allylphenol-modified terminal (PDMS) having a number of repetitions of a dimethylsiloxane unit of 90, and 8.8 mL of triethylamine were loaded into a 50-L vessel type reactor mounted with a baffle board, a paddle type stirring blade, and a cooling jacket. 1,389 Grams of 6.4 mass % aqueous sodium hydroxide was added to the mixture under stirring to perform a reaction between the polycarbonate oligomer and the PDMS with allylphenol-modified terminal for 10 minutes.

A solution of p-t-butylphenol (PTBP) in methylene chloride (prepared by dissolving 132 g of PTBP in 2.0 L of methylene chloride) and a solution of BPA in aqueous sodium hydroxide (prepared by dissolving 1,012 g of BPA in an aqueous solution prepared by dissolving 577 g of NaOH and 2.0 g of sodium dithionite in 8.4 L of water) were added to the polymerization liquid to perform a polymerization reaction for 50 minutes.

10 Liters of methylene chloride was added to the resultant for dilution and the mixture was stirred for 10 minutes. After that, the mixture was separated into an organic phase containing a polycarbonate-polydimethylsiloxane copolymer, and an aqueous phase containing excess amounts of BPA and NaOH, and the organic phase was isolated.

The solution of the polycarbonate-polydimethylsiloxane copolymer in methylene chloride thus obtained was sequentially washed with 0.03 mol/L aqueous NaOH and 0.2 mol/L hydrochloric acid in amounts of 15 vol % each relative to the solution. Subsequently, the solution was repeatedly washed with pure water until an electric conductivity in an aqueous phase after the washing became 0.01 µS/m or less.

The solution of the polycarbonate-polydimethylsiloxane copolymer in methylene chloride obtained by the washing was concentrated and pulverized, and the resultant flake was dried under reduced pressure at 120° C.

The resultant polycarbonate-polydimethylsiloxane copolymer had a PDMS block portion content determined by nuclear magnetic resonance (NMR) of 6.0 mass %, a viscosity number measured in conformity with ISO 1628-4 (1999) of 49.5, and a viscosity-average molecular weight Mv of 18,500.

Examples 1 to 10 and Comparative Examples 1 to 6

Respective components were mixed at ratios shown in Tables 1 and 2 [the amount of the component (B) is represented in the unit of part(s) by mass relative to 100 parts by mass of the component (A), and the amounts of the component (A-1) and the component (A-2) constituting the component (A) are each represented in a mass % unit], and the mixture was further homogeneously mixed with 0.02 part by mass of tris(2,4-di-t-butylphenyl)phosphite (IRGAFOS 168, trade name, manufactured by Ciba Specialty Chemicals Inc.) as an antioxidant. The resultant was granulated with a vented uniaxial extrusion molding machine (manufactured by Nakatani Machinery Ltd., model name: NVC-50) at a resin temperature of 280° C. to provide a pellet.

The resultant pellet was subjected to injection molding with an injection molding machine under the molding conditions of a cylinder temperature of 280° C. and a die temperature of 80° C. to provide a test piece.

The resultant test piece was evaluated for its sodium content, viscosity number, L* value, weatherability, IZOD impact value, and light transmittances in accordance with the above-mentioned methods. The results are shown in Table 1 and Table 2.

[Description of Annotations in Table 1 and Table 2]
*1: PC-PDMS copolymer-1 obtained in Production Example 2: Its sodium content is below the lower limit of detection, component (A-1)
*2: PC-PDMS copolymer-2 obtained in Production Example 3: Its sodium content is below the lower limit of detection, component (A-1)
*3: "TARFLON FN1700A: Its sodium content is below the lower limit of detection" (trade name, manufactured by Idemitsu Kosan Co., Ltd., bisphenol A-type aromatic polycarbonate having as its terminal group p-t-butylphenol, viscosity-average molecular weight: 17,700), component (A-2)
*4: Bisbenzoxazinone manufactured by Takemoto Oil & Fat Co., Ltd., "trade name, PIONIN ZA-101, benzoxazinone-based UV absorber: Its sodium content is 760 ppm," component (B)

TABLE 1

| | | | Comparative Example 1 | Comparative Example 2 | Example 1 | Example 2 | Example 3 | Example 4 | Comparative Example 3 | Comparative Example 4 |
|---|---|---|---|---|---|---|---|---|---|---|
| (A) | PC-PDMS copolymer 1*1: (A-1) | | — | — | 100 | 100 | 100 | 100 | 100 | 50 |
| | PC-PDMS copolymer 2*2: (A-1) | | — | — | — | — | — | — | — | — |
| | FN1700A*3: (A-2) | | 100 | 100 | — | — | — | — | — | 50 |
| (B) | PIONIN ZA-101*4 | | — | 0.5 | — | — | — | 0.05 | 0.2 | 0.2 |
| | UV-3638F*5 | | 1.5 | — | 0.2 | 1.5 | 0.2 | — | — | — |
| | Irg. 168*6 | | 0.02 | 0.02 | 0.02 | 0.02 | 0.02 | 0.02 | 0.02 | 0.02 |
| | PETS EW-440A*7 | | — | — | — | — | 0.2 | — | — | — |
| Performance evaluation | (1) Sodium content (ppm) | | 0.255 | 3.8 | 0.034 | 0.255 | 0.074 | 0.38 | 1.52 | 1.52 |
| | (2) Viscosity number | | 45.7 | 42.8 | 47.6 | 47.1 | 47.9 | 47.8 | 42.4 | 43.5 |
| | (3) L* value CIE1976 L*a*b* | L* | 95.6 | 94.8 | 95.0 | 95.3 | 95.5 | 65.5 | 4.4 | 11.4 |
| | | a* | −0.4 | −0.5 | −0.3 | −0.6 | −0.3 | 4.9 | 0.00 | 0.2 |
| | | b* | 1.0 | 2.0 | 1.9 | 2.1 | 1.6 | 40.0 | 1.8 | 2.8 |
| | (4) Weatherability test/Change in L* value | 0 hr | 95.6 | 94.8 | 95.0 | 95.3 | 95.5 | 65.5 | 4.4 | 11.4 |
| | | 2,040 hr | 90.6 | 88.3 | 89.5 | 92.3 | 90.3 | 61.3 | — | — |
| | | ΔL* | 5.0 | 6.5 | 5.5 | 3.0 | 5.2 | 4.2 | — | — |
| | (5) IZOD impact value | 23° C. kJ/m² | 16.9 | 8.2 | 65.5 | 45.8 | 61.3 | 63.8 | 58.3 | 52.2 |
| | (6) Light transmittance (%) | Total light | 89.7 | 89.1 | 89.1 | 89.2 | 89.3 | 54.3 | 15.8 | 29.5 |
| | | Diffuse light | 0.9 | 2.1 | 1.7 | 1.0 | 0.9 | 25.9 | 15.6 | 29.3 |
| | | Parallel light | 88.8 | 87.0 | 87.3 | 88.2 | 88.4 | 28.4 | 0.1 | 0.2 |

TABLE 2

| | | | Example 5 | Comparative Example 5 | Example 6 | Example 7 | Example 8 | Example 9 | Example 10 | Comparative Example 6 |
|---|---|---|---|---|---|---|---|---|---|---|
| (A) | PC-PDMS copolymer 1*1: (A-1) | | 100 | 100 | 50 | — | — | — | 100 | — |
| | PC-PDMS copolymer 2*2: (A-1) | | — | — | — | 50 | 100 | 50 | — | 100 |
| | FN1700A*3: (A-2) | | — | — | 50 | 50 | — | 50 | — | — |
| (B) | PIONIN ZA-101*4 | | — | — | — | — | — | 0.05 | 0.05 | 0.1 |
| | UV-3638F*5 | | 2.5 | 5 | 0.2 | 0.2 | 0.2 | — | — | — |
| | Irg. 168*6 | | 0.02 | 0.02 | 0.02 | 0.02 | 0.02 | 0.02 | 0.02 | 0.02 |
| | PETS EW-440A*7 | | — | — | — | — | — | — | — | — |
| Performance evaluation | (1) Sodium content (ppm) | | 0.425 | 0.85 | 0.034 | 0.034 | 0.034 | 0.38 | 0.38 | 0.76 |
| | (2) Viscosity number | | 46.2 | 43.3 | 46.5 | 47 | 47.3 | 48.3 | 49.7 | 46.6 |
| | (3) L* value CIE1976 L*a*b* | L* | 94.4 | 95.5 | 95.4 | 85.5 | 82.5 | 69.4 | 67.3 | 4.4 |
| | | a* | −0.8 | −1.1 | −0.6 | −1.5 | −0.9 | 4.0 | 5.4 | 0.3 |
| | | b* | 3.6 | 3.5 | 3.0 | 24.1 | 30.2 | 42.5 | 45.7 | 2.5 |
| | (4) Weatherability test/Change in L* value | 0 hr | 94.4 | 95.5 | 95.4 | 85.5 | 82.5 | 69.4 | 67.3 | 4.4 |
| | | 2,040 hr | 92.4 | 94.1 | 84.6 | 78.0 | 80.5 | 60.2 | 61.3 | — |
| | | ΔL* | 2.0 | 1.4 | 10.8 | 7.5 | 2.0 | 9.2 | 6.0 | — |
| | (5) IZOD impact value | 23° C. kJ/m² | 13.3 | 4.4 | 62.2 | 64.9 | 61.8 | 66.0 | 68.2 | 57.8 |
| | (6) Light transmittance (%) | Total light | 88.5 | 88.8 | 88.4 | 74.3 | 71.4 | 60.8 | 59.9 | 21.8 |
| | | Diffuse light | 3.8 | 1.0 | 0.9 | 8.2 | 10.9 | 22.6 | 24.4 | 21.6 |
| | | Parallel light | 84.7 | 87.7 | 87.5 | 66.1 | 60.5 | 38.2 | 35.6 | 0.2 |

*5: Bisbenzoxazinone manufactured by Cytec Technology Corporation, "trade name, UV-3638F, benzoxazinone-based UV absorber: Its sodium content is 17 ppm," component (B)

*6: Tris(2,4-di-t-butylphenyl)phosphite manufactured by Ciba Specialty Chemicals, "trade name, IRGAFOS 168, phosphorus-based antioxidant: Its sodium content is below the lower limit of detection," component (B)

*7: Mixture of a full ester of pentaerythritol and stearic acid and a full ester of pentaerythritol and palmitic acid (mixing ratio is C16:C18=1:1.1) manufactured by Riken Vitamin Co., Ltd., "EW 440A, release agent: Its sodium content is 20 ppm."

The lower limit of detection of sodium in this measurement method is 100 ppb.

It is found from Table 1 and Table 2 that the polycarbonate-based resin composition of the present invention shows a small reduction in viscosity number, shows a small reduction in L* value immediately after its molding, and shows a small change in L* value in the weatherability test because its sodium content is 0.5 ppm or less. It is also found that the polycarbonate-based resin composition of the present invention shows a small reduction in impact resistance and is excellent in transparency. On the other hand, it is found from Comparative Examples 1 to 6 that a resin composition that does not use the component (A-1) is reduced in impact resistance. In addition, it is found that even in the case where the composition uses the component (A-1), when the sodium content in the composition exceeds 0.5 ppm, a reduction in L* value immediately after its molding is so large that its transparency is impaired. Accordingly, it is difficult to determine a change in L* value in the weatherability test. Alternatively, it is found that its impact resistance may reduce.

INDUSTRIAL APPLICABILITY

The polycarbonate-based resin composition of the present invention is excellent in transparency, weatherability, and impact resistance, and hence can be suitably used in fields in which these characteristics are required such as electrical and electronic equipment, information and communication equipment, household electrical appliances, OA equipment, an automobile field, and a building material field.

What is claimed is:

1. A polycarbonate-based resin composition, comprising a blend of:
    a polycarbonate-based resin; and
    at least one additive comprising sodium,
wherein:
    the polycarbonate-based resin composition has a sodium content of 0.5 ppm or less;
    the polycarbonate-based resin comprises:
        10 mass % to 100 mass % of a polycarbonate-polyorganosiloxane copolymer comprising, in a main chain thereof, a repeating unit represented by formula (I) and a repeating unit represented by formula (II), the copolymer having a content of the repeating unit represented by formula (II) of from 1.0 mass % to 10.0 mass %; and
    0 mass % to 90 mass % of a polycarbonate;
wherein in formula I and formula II:

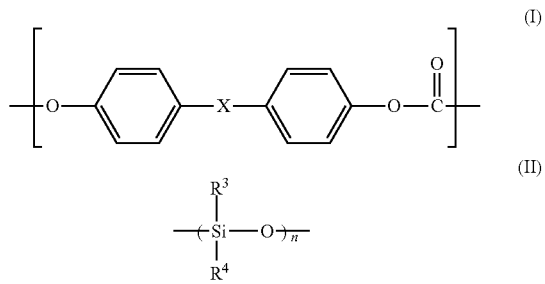

n represents an average number of repetitions in formula II and n=10 to 500;
X represents an isopropylidene group; and
$R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms.

2. The polycarbonate-based resin composition according to claim 1, wherein a blending amount of the at least one additive is from 0.01 part by mass to 5 parts by mass relative to 100 parts by mass of the polycarbonate-based resin.

3. The polycarbonate-based resin composition according to claim 1, wherein an L* value in a CIE 1976 (L*, a*, b*) color space measured by using a flat test piece having a thickness of 2 mm is 50 or more, the flat test piece being produced by molding the polycarbonate-based resin composition at a cylinder temperature of a molding machine of 280° C., a die temperature of 80° C., and a molding cycle of 30 seconds.

4. The polycarbonate-based resin composition according to claim 1, wherein the at least one additive comprises a UV absorbe.

5. The polycarbonate-based resin composition according to claim 4, wherein the UV absorber is a compound represented by formula (1) and has a sodium content of 40 ppm or less:

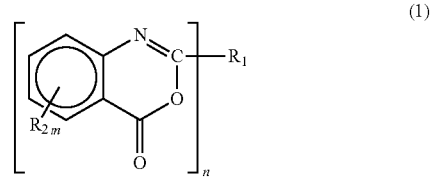

wherein:
$R_1$ represents a residue obtained by removing n hydrogen atoms from a hydrocarbon compound having 1 or 2 aromatic rings in a molecule thereof;
$R_2$ represents hydrogen, a halogen group, a nitro group, an alkyl group having 1 to 8 carbon atoms, an alkoxyl group having 1 to 8 carbon atoms, or an alkenyloxy group having 2 to 8 carbon atoms;
n represents an integer of 2 or 3; and
m represents an integer of from 1 to 4.

6. The polycarbonate-based resin composition according to claim 4, wherein the UV absorber is p-phenylenebis(1,3-benzoxazin-4-one).

7. The polycarbonate-based resin composition according to claim 4, wherein a blending amount of the UV absorber is from 0.05 part by mass to 0.5 part by mass relative to 100 parts by mass of the polycarbonate-based resin.

8. The polycarbonate-based resin composition according to claim 4, wherein a blending amount of the UV absorber is from 0.2 part by mass to 3 parts by mass relative to 100 parts by mass of the polycarbonate-based resin.

9. A molded body, produced by molding re polycarbonate-based resin composition according to claim 1.

10. An injection-molded body, produced by subjecting the polycarbonate-based resin composition according to claim 7 to injection molding.

11. A sheet-shaped molded body, produced by subjecting the polycarbonate-based resin composition according to claim 8 to extrusion molding.

12. The polycarbonate-based resin composition according to claim 1, wherein the polycarbonate-polyorganosiloxane copolymer has a viscosity average molecular weight of 14,000 to 28,000.

13. The polycarbonate-based resin composition according to claim 1, wherein n=32-97.

14. The polycarbonate-based resin composition according to claim 1, wherein the poly carbonate has a viscosity average molecular weight of 10,000 to 40,000.

15. The polycarbonate-based resin composition according to claim 1, wherein the at least one additive comprises an antioxidant.

16. The polycarbonate-based resin composition according to claim 1, wherein the antioxidant is selected from the group consisting of a phenol-based antioxidant, a phosphorus-based antioxidant and a sulfur-based antioxidant.

17. The polycarbonate-based resin composition according to claim 1, wherein each of the at least one additive has a sodium content of 40 ppm or less.

18. The polycarbonate-based resin composition according to claim 1, wherein the polycarbonate-based resin composition has a sodium content of 0.4 ppm or less.

19. A polycarbonate-based resin composition, comprising a blend of:
a polycarbonate-based resin; and
at least one additive comprising sodium,
wherein:
the polycarbonate-based resin composition has a sodium content of 0.5 ppm or less;
the polycarbonate-based resin comprises:
10 mass % to 100 mass % of a polycarbonate-polyorganosiloxane copolymer comprising, in a main chain thereof, a repeating unit represented by formula (I) and a repeating unit represented by formula (II), the copolymer having a content of the repeating unit represented by formula (II) of from 1.0 mass % to 10.0 mass %; and
0 mass % to 90 mass % of a polycarbonate;
wherein in formula I and formula II:

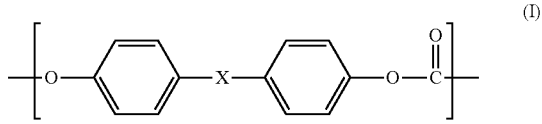

(I)

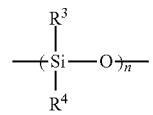

(II)

n represents an average number of repetitions in formula II and n=10 to 500;
X represents an isopropylidene group; and
$R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms
the at least one additive comprises a UV absorber;
the UV absorber is p-phenylenebis(1,3-benzoxazin-4-one); and
a blending amount of the UV absorber is from 0.2 part by mass to 3 parts by mass relative to 100 parts by mass of the polycarbonate-based resin.

20. A polycarbonate based resin composition, comprising a blend of:
a polycarbonate-based resin; and
at least one additive comprising sodium,
wherein:
the polycarbonate-based resin composition has a sodium content of 0.5 ppm or less;
the polycarbonate-based resin comprises:
10 mass % to 100 mass % of a polycarbonate-polyorganosiloxane copolymer consisting of, in a main chain thereof, a repeating unit represented by formula (I) and a repeating unit represented by formula II), the copolymer having a content of the repeating unit represented by formula (II) of from 1.0 mass % to 10.0 mass %; and
0 mass % to 90 mass % of a polycarbonate;
wherein in formula I and formula II:

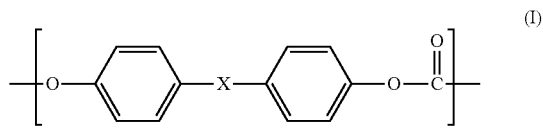

(I)

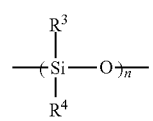

(II)

n represents an average number of repetitions in formula II and n=10 to 500;
X represents an isopropylidene group; and
$R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms
wherein the polycarbonate has a viscosity average molecular weight of 10,000 to 40,000 or the polycarbonate-polyorganosiloxane copolymer has a viscosity average molecular weight of 14,000 to 28,000.

* * * * *

UNITED STATES PATENT AND TRADEMARK OFFICE
CERTIFICATE OF CORRECTION

PATENT NO. : 10,072,134 B2  
APPLICATION NO. : 14/783581  
DATED : September 11, 2018  
INVENTOR(S) : Nobuhiro Watanabe Page 1 of 1

It is certified that error appears in the above-identified patent and that said Letters Patent is hereby corrected as shown below:

In the Claims

Column 24, Line 40, "absorbe" should read --absorber--

Column 25, Line 9, "re polycarbonate-based" should read --the polycarbonate-based--

Column 25, Line 23, "poly carbonate" should read --polycarbonate--

Signed and Sealed this  
Eleventh Day of June, 2019

Andrei Iancu  
*Director of the United States Patent and Trademark Office*